US011022419B2

(12) United States Patent
Douglas et al.

(10) Patent No.: US 11,022,419 B2
(45) Date of Patent: Jun. 1, 2021

(54) THREAD INSPECTION SYSTEMS AND METHODS

(71) Applicant: Gagemaker, L.P., Pasadena, TX (US)

(72) Inventors: James R. Douglas, Houston, TX (US); Kris L. Dawson, Pearland, TX (US); Stephen C. Janes, Sugar Land, TX (US)

(73) Assignee: Gagemaker, L.P., Pasadena, TX (US)

( * ) Notice: Subject to any disclaimer, the term of this patent is extended or adjusted under 35 U.S.C. 154(b) by 0 days.

(21) Appl. No.: 16/595,206

(22) Filed: Oct. 7, 2019

(65) Prior Publication Data

US 2020/0109935 A1 Apr. 9, 2020

Related U.S. Application Data

(63) Continuation of application No. 15/216,952, filed on Jul. 22, 2016, now Pat. No. 10,436,564.

(60) Provisional application No. 62/196,110, filed on Jul. 23, 2015.

(51) Int. Cl.
*G01B 5/16* (2006.01)
*G01B 3/20* (2006.01)

(52) U.S. Cl.
CPC ............. *G01B 5/163* (2013.01); *G01B 3/205* (2013.01)

(58) Field of Classification Search
CPC .... G01B 11/2425; G01B 11/245; G01B 3/48; G01B 11/2433; G01B 3/36; G01B 5/204; G01B 11/08; G01B 11/25
USPC ...................................................... 33/199 R
See application file for complete search history.

(56) References Cited

U.S. PATENT DOCUMENTS

| | | | |
|---|---|---|---|
| 4,524,524 A | 6/1985 | Frank et al. | |
| 4,700,484 A | 10/1987 | Frank et al. | |
| 5,182,862 A | 2/1993 | Frank et al. | |
| 5,276,971 A | 1/1994 | Brewster | |
| 5,521,707 A | 5/1996 | Castore et al. | |
| 5,574,381 A | 11/1996 | Andermo et al. | |
| 5,932,789 A * | 8/1999 | Stein .................... | G01N 3/56 451/294 |
| 6,047,479 A | 4/2000 | Galestien | |
| 6,145,207 A | 11/2000 | Brunson | |
| 6,205,672 B1 | 3/2001 | Paulson et al. | |
| 6,279,248 B1 | 8/2001 | Walters | |
| 6,408,532 B1 | 6/2002 | Keys et al. | |
| 7,765,712 B2 | 8/2010 | Stockman | |
| 9,752,427 B2 | 9/2017 | Douglas et al. | |
| 10,254,099 B1 | 4/2019 | Frank et al. | |

(Continued)

OTHER PUBLICATIONS

Copenheaver,B., copy of International Search Report for International Application No. PCT/US2016/043515, U.S. Patent and Trademark Office, dated Oct. 6, 2016.

(Continued)

*Primary Examiner* — Yaritza Guadalupe-McCall
(74) *Attorney, Agent, or Firm* — McAughan Deaver PLLC

(57) ABSTRACT

A screw thread measurement system and methods may comprise a frame having a reference surface, a carrier coupled to the frame and configured to translate relative to the frame, a dimension measurement system coupled to the carrier and having a thread contact element configured to translate relative to the frame and orthogonally the translation axis of the carrier. The dimension measurement system configured to determine thread dimensions relative to the frame reference surface.

20 Claims, 11 Drawing Sheets

(56) References Cited

U.S. PATENT DOCUMENTS

| | | |
|---|---|---|
| 10,436,015 B2 | 10/2019 | Douglas et al. |
| 10,436,564 B2* | 10/2019 | Douglas ................ G01B 3/205 |
| 2003/0047009 A1 | 3/2003 | Webb |
| 2003/0101602 A1 | 6/2003 | Galestien |
| 2010/0110448 A1 | 5/2010 | Johnson |
| 2014/0259719 A1 | 9/2014 | Thorley et al. |
| 2015/0219431 A1 | 8/2015 | Jordli |
| 2016/0123712 A1 | 5/2016 | Cook |
| 2019/0145749 A1 | 5/2019 | Thomas et al. |
| 2020/0109935 A1* | 4/2020 | Douglas ................ G01B 3/205 |

OTHER PUBLICATIONS

Copenheaver, B., copy of Written Opinion for International Application No. PCT/US2016/043515, U.S. Patent and Trademark Office, dated Oct. 6, 2016.

* cited by examiner

| Calculator for Computing the Expected Measured | | |
|---|---|---|
| | INPUTS | |
| 1102 | LS - Stab Lead [in.] | 0.55 |
| 1104 | LL - Load Lead [in.] | 0.58 |
| 1106 | ΨS - Stab Flank Angle [Degrees] | 5 |
| 1108 | ΨL - Load Flank Angle [Degrees] | 5 |
| 1110 | HS - Stab Height [in.] | 0.097 |
| 1112 | HL - Load Height [in.] | 0.07 |
| 1114 | M - Distance from Datum Face to Sweet Spot [in.] | 5.24215 |
| 1116 | N - Pitch Diameter at Sweet Spot [in.] | 3 |
| 1118 | W - Sweet Spot Groove Width [in.] | 0.2841 |
| 1120 | K - Height from Root to Sweet Spot [in.] | 0.035 |
| 1122 | D - Contact Point Diameter [in.] | 0.072 |
| 1124 | GS - Gage Measured Distance from Datum Face to a Stab Flank [in.] | 4.143 |
| | CALCULATIONS | |
| 1150 | ΔH | 0.027 |
| 1152 | THS | 0.03914 |
| 1154 | QS | 0.00023 |
| 1156 | ZGS | -1.09892 |
| 1158 | OGS | -12.5541 |
| 1160 | ZPL | -1.44297 |
| 1162 | THL | 0.03914 |
| 1164 | QL | 0.00023 |
| 1168 | PL | 3.87141 |

FIG. 11

THREAD INSPECTION SYSTEMS AND METHODS

CROSS REFERENCE TO RELATED APPLICATIONS

This application is a continuation of application Ser. No. 15/216,952, which was filed on Jul. 22, 2016 and issued as U.S. Pat. No. 10,436,564 and claims priority and benefit thereto. Application Ser. No. 15/216,952 was a non-provisional of U.S. Provisional Application Ser. No. 62/196,110, filed on Jul. 23, 2015, and claims priority and benefit thereto. The entire contents and disclosures of U.S. Non-provisional application Ser. No. 15/216,952 and Provisional Application Ser. No. 62/196,110 are incorporated by reference herein for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to inspecting and/or measuring the dimensions of screw thread systems; and more specifically related to, but are not limited to, inspecting and measuring wedge thread systems.

Description of the Related Art

Screw thread systems, or simply threads, are used throughout industry to connect or couple two or more items. For example and without limitation, threads are used on oilfield tubular products, such as casing, to join together two sections or joints and to provide a leak resistant, load bearing connection. There exists in use today a wide variety of public and proprietary thread forms. One type of thread form routinely used for oilfield tubulars is the "wedge" thread. For purposes of this disclosure, a wedge thread increases in root width in opposite directions on a pin member and a box member. In other words, the axial distance between the load flank of a wedge thread and stab flank of a wedge thread (i.e., the thread width) increases in opposite directions. The increasing (and decreasing) width of a wedge thread is an artifact of the difference in thread lead for the stab flank and the load flank. This difference in lead causes the threads to vary in width along the screw thread system.

For purposes of this disclosure, the term "load flank" refers to the sidewall surface of the thread that faces away from the pin end or box end of the tubular. The load flank reacts the weight and other forces of the tubular members hanging in the well bore. The term "stab flank" designates the sidewall surface of the thread that faces toward the pin or box end and reacts forces tending to compress the tubulars toward each other.

In practice, such as during manufacture, the width of the wedge thread at a single axial location, such as, for example, the middle (e.g., $6^{th}$) thread is used as a proxy for the dimensional accuracy of the entire thread system. The industry has come to refer to this single location as the "sweet spot;" that is, the mid-point of the thread length where the groove width and tooth width are equal. Of course, each thread system manufacturer can define the "sweet spot" however it chooses, or not at all. In other words, it is conventional for the dimensional accuracy of a wedge thread system to be judged based on the dimensions of the "sweet spot." If the thread width at this know location meets the tolerance for that location based on the design schematics, the entire wedge thread system is deemed acceptable. These width measurements are typically made using a conventional depth gage, such as the DG-1000 series available from Gagemaker, LP of Pasadena, Tex.

FIG. 1 depicts a prior art DG-1000 series depth gage in use to measure the load and stab flanks of the sweet spot of the pin end of an oilfield tubular 102. In practice, the depth gage 100 is referenced to the pin end 112, and the measurement head 108 is manually translated or extended until the contact probe 110 contacts the desired thread root. Once the contact probe is in the desired position (e.g., contacting the thread root and thread flank) the distance from the reference surface 112 to the thread flank can be read from the gage display 106. The measurement head 108 can be manually translated across the thread root to the associated flank and another measurement taken. The difference between these two measurements establishes the thread width and the measured distance from the pin end. These measurements are compared to the design dimensions to assess whether the thread system has been manufactured to specifications.

If threads at other locations on the product 102 are desired to be measured, the operator/inspector typically must remove the gage 100 from the tubular product, relocate it to the desired position, and reset the gage against the reference point 112 (e.g., pin end) and repeat the measurement process.

FIG. 2 illustrates another prior art system and method for determining whether a wedge thread system conforms to design specifications using measurements at the sweet spot. A gage pin 208 comprises contact surfaces 206a and 206b at one end. The outer surfaces of contacts 206a and 206b are configured at a predetermined width "w" 202, such as, for example, the design width "w" at the sweet spot, e.g., a width of 0.2841 inch (7.2161 mm) at a distance of 5.24215 inches (133.151 mm) from the datum. In use, the gage pin 208 is placed in a wedge thread root wider than the width of the gage pin contact surfaces 206a and 206b. The user manually slides the gage pin along the root surface in the direction of narrowing thread root until the gage pin contact surfaces 206a and 206b engage the stab flank 212 and load flank 210, respectively. Once the gage pin is firmly located in position in the thread system, a depth gage, such as the DG-1000 series discussed above, is used to measure the distance 204 from a reference or datum surface, such as a pin or box end, to the gage pin 208. This distance, corrected as desired to indicate stab flank distance or load flank distance or centerline distance is compared against design specifications. It will be appreciated that these gross inspections are incapable of determining if the stab lead or the load lead is in error, and can only determine that the thread width at that particular location does or does not conform to design specifications.

The present invention is directed to screw thread inspection systems and methods useful for measuring wedge threads at a variety of locations that overcome many of the limitations of prior art systems and provides additional measurement and inspection functionality.

BRIEF SUMMARY OF THE INVENTION

A non-limiting general summary of the inventions disclosed and taught herein may be expressed as, the inventions disclosed and taught herein can measure along the Z-axis every stab flank and load flank with reference to the datum face at positions between 0° through 360°; can acquire and/or store, internally or to a remote database, all measurements taken, via wired transmission or wireless transmission, such as, Bluetooth, Radio Frequency or Wi-Fi; can calculate the groove or root width based off of the stab flank measured length from the design Sweet Spot; can calculate the groove or root width based off of the load flank measured length from the design Sweet Spot; can create a display or report, such as a sinusoidal mathematical curve, of the groove or root width based off of the stab flank measured length from the design Sweet Spot and/or the groove or root width based off of the load flank measured length from the design Sweet Spot; can display or report the errors/variance to design parameters of each groove width location from the datum face up the taper cone of a thread system; can calculate the length and radial circumferential location from the design Sweet Spot to the measured location; can provide a best average of any groove width and location that is out of design tolerance, which groove width is smaller than design parameters; can display or report, such as by plotting make-up length loss based on grooves or roots that are narrower than design widths; can measures the lead parallel to the Z-axis axis; and/or can display or report, such as by plotting, all stab and load flanks relative to the datum for "Drunken" lead of each flank; and can store all measured values to one or more files, including operators name, part serial number, job order number, date, pipe heat numbers and traceability certifications.

Another non-limiting summary of the inventions disclosed and taught herein may be expressed as a screw thread inspection system may comprise a frame having a first portion configured as a datum reference surface defining a plane and a second portion; a dimension measurement system coupled to the second frame portion and configured to determine distance from the datum reference surface along a first axis perpendicular to the reference surface plane; the dimension measurement system also configured to translate along a second axis perpendicular to the first axis; and a data processing system configured to receive and manipulate distance data received by the dimension measurement system. The dimension measurement system may be configured to determine distance from the frame along the second axis. The dimension measurement system may be coupled to a trolley configured to translate along the second axis relative to the second frame portion. The dimension measurement system may comprise a slider, a measurement head at one end of the slider and a thread contact probe associated with the measurement head. The dimension measurement system may comprise a support structure configured to augment the structural rigidity of the dimension measurement system. The data processing system may be housed with or adjacent the dimension measurement system. The data processing system may be remote from the dimension measurement system. The dimension measurement system may comprise wired or wireless data transmission capability to the remote data processing system. The remote data processing system may be one or more of a smart phone, a tablet, an iPad, a laptop computer, a computer, a website, or any combination thereof.

Yet another non-limiting summary of the inventions disclosed and taught herein may be expressed as A method of inspecting a screw thread system with any of the inspections systems described herein, the method comprising contacting the datum reference surface to a dimensional reference associated with the thread system; zeroing the dimension measurement system along the first axis to the dimensional reference; translating a contact element associated with the dimension measurement system along the first axis to a first thread system artifact; acquiring data representing the distance along the first axis from the dimensional reference to the first artifact; translating the contact element along the first axis to a second thread system artifact; acquiring data representing the distance along the first axis from the dimensional reference to the second artifact; and determining the distance between the first and second artifact. This method can be applied to a wedge thread system having a plurality of stab flanks and a plurality of load flanks. The first thread system artifact may be a stab flank and the second artifact may be a load flank. The first and second artifacts are associated with a predetermined thread design sweet spot having a design distance from the dimensional reference. The methods may also comprise comparing at least one of the stab flank distances or the load flank distances with the predetermined sweet spot design distance. The methods may also comprise creating a report of the variance between at least one of the stab flank distances or the load flank distances and the design distance for the predetermined sweet spot. The methods may also comprise acquiring a plurality of additional stab flank distances along the first axis for the thread system and determining a stab flank lead for the thread system. The methods may also comprise acquiring a plurality of additional load flank distances along the first axis for the thread system and determining a load flank lead for the thread system. The methods may also comprise acquiring a plurality of additional stab flank distances along the first axis for the thread system; calculating a stab flank lead for the thread system; acquiring a plurality of additional load flank distances along the first axis for the thread system; calculating a load flank lead for the thread system; comparing at least one of the calculated stab lead and load lead against a corresponding design lead; and reporting a variance between the at least one of the calculated stab lead and load lead and the corresponding design lead. The methods may also comprise determining whether the thread system suffers one or more drunken leads. The methods may also comprise generating a report from the measured data, which includes at least one of: an operator's name, a part serial number, a job order number, a date, a pipe heat number or a traceability certification.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 11 illustrates the type of data that may be inputted to a data processing system and the type of calculations that may be carried out by a data processing system according to the present inventions.

Figure 1:
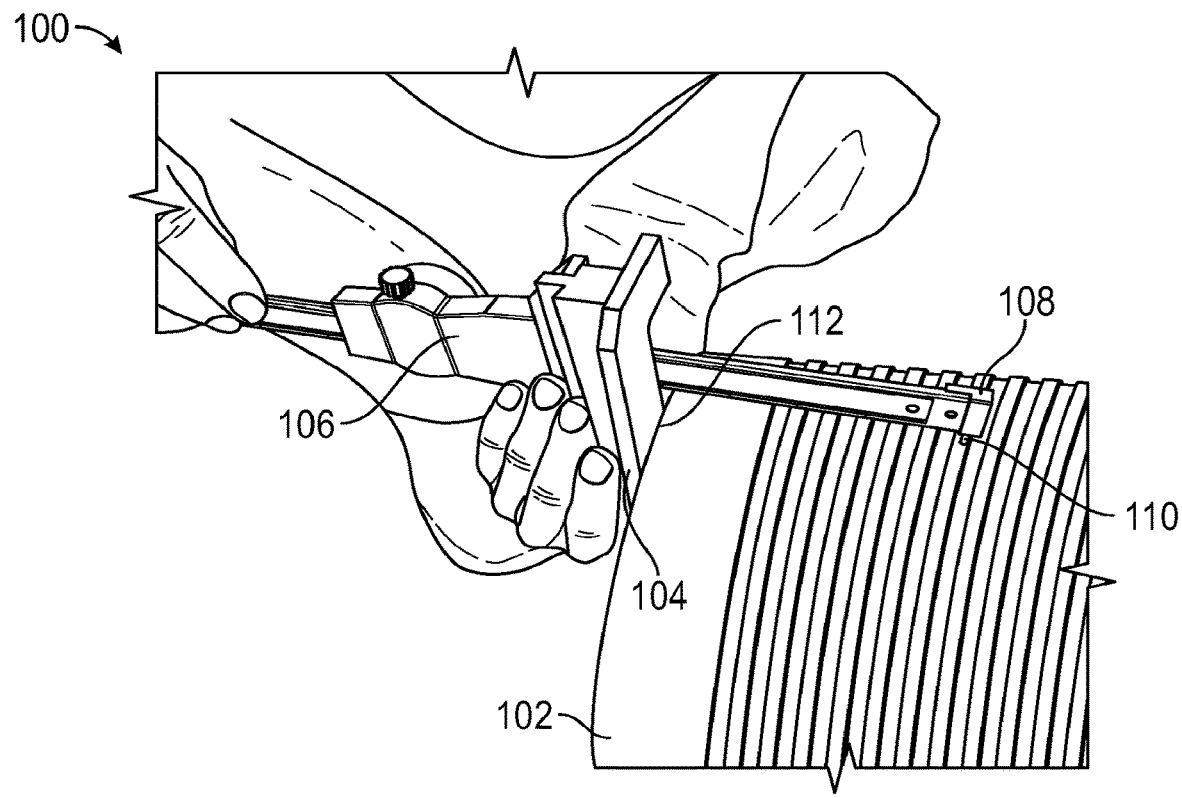
FIG. 1 illustrates a prior art wedge thread inspection system utilizing a conventional depth gage.
Figure 2:
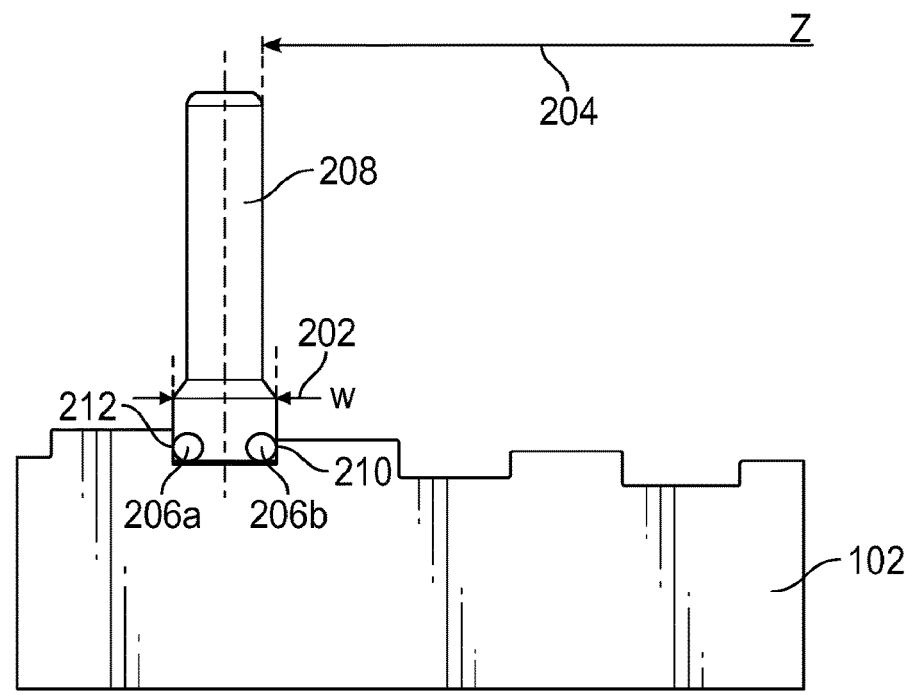
FIG. 2 illustrates a prior art wedge thread inspection system comprising a gage pin.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are provided to teach any person skilled in the art how to make and use the inventions for which patent protection is sought. The figures and description of possible embodiments are not presented to limit the scope of what has been invented or the scope of the appended claims. Rather, this disclosure is provided so that once it has been studied, a person of skill in the art will be able to practice the inventions in an unlimited number of embodiments, subject to Applicant's rights bestowed by the Constitution and other laws of the United States. Those skilled in the art will appreciate that, for the sake of clarity and understanding, not all features of a commercial embodiment of the inventions are described or shown. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," "X," "Y," "Z" and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

We have created screw thread inspection systems and methods useful for measuring the dimensions of screw thread systems, such as, but not limited to, wedge thread systems. In general, our inventions comprise a frame system that is configured to provide several functions. The frame may be structured to have two portions: a reference or datum surface or surfaces configured to engage or contact a portion or multiple portions of the part on which the screw thread system resides, and a carrier portion. The carrier portion may be "universalized" so that it can be coupled with multiple different datum surfaces for use with multiple different thread systems or threaded products. For example, and without limitation, a datum surface may comprise removable or replaceable bumpers. Such bumpers can be made from a wide variety of suitable materials, including, but not limited to, metal, Teflon, High Density Polyethylene, and other such materials. In practice, the datum or reference surface(s) should engage or contact a reference or datum surface on the part, such as the pin end of a threaded tubular product. A goal of the reference surface configuration is to provide a repeatable and accurate reference surface for multiple thread measurements, without marring or damaging the part.

The frame may be structured to have a portion, such as the carrier portion, configured to support an analog or digital dimension measurement system, such as, without limitation, a dial indicator gage, a linear indicator gage, or a digital measurement gage. In most, but not necessarily all, embodiments, the measurement axis of the dimension measurement system will be orthogonal or normal to the plane of the reference or datum surface(s). The carrier portion of the frame may be configured to allow the dimension measurement system to move relative to the reference surface and preferably orthogonally to the measurement axis. For example, the dimension measurement system may be coupled to the carrier such that the dimension measurement system (or at least a portion thereof) may translate relative to the frame along the measurement axis (e.g., Z-axis), and translate relative to the frame and orthogonally to the measurement axis (e.g., X-axis). Typically, the Z-axis is also the centerline of the thread system, and the X-axis intersects the Z-axis orthogonally. A trolley or other structure can be provided on the carrier to support translation in the X-axis. The carrier portion also preferably comprises a dimension measurement support system configured to provide additional rigidity and support to the measurement system slide in all planes to resist bending and unwanted movement.

Embodiments may or may not comprise one or more cosmetic covers associated with inspection system. If provided, such covers may provide a grip or gripping surfaces for handled operation; may provide dirt or debris protection to the moving and/or sensitive components of the dimension measurement system and trolley; house one or more power sources, such as batteries; and/or house wired and/or wireless communications functionality.

The dimension measurement system comprises a Z-axis displacement transducer, such as but not limited to a resistive sensor; a capacitive sensor; an inductive sensor, such as an LVDT, an LVRT and/or an LVIT; a magnetic sensor, such as a Hall-Effect sensor; a time-of-flight sensor, such as an MLDT, ultrasonic, or laser sensor; or a pulse encoding sensor. Any of these may be configured to detect and determine relative or absolute displacement in the axial or Z-axis direction. Additionally or optionally, the carrier may comprise one or more transducers, such as but not limited to a resistive sensor; a capacitive sensor; an inductive sensor, such as an LVDT, an LVRT and/or an LVIT; a magnetic sensor, such as a Hall-Effect sensor; a time-of-flight sensor, such as an MLDT, ultrasonic, or laser sensor; or a pulse encoding sensor. Any of these may be configured to detect and determine relative or absolute displacement in the radial or X-axis direction.

In some embodiments, the frame, and particularly the datum surface, may comprise one or more openings or windows through which the dimension measurement system may translate along the Z and X axes. Also, the frame may be configured to minimize the weight of the inspection system to support handheld operation.

Referring back to the reference or datum surface and bumpers described above, the reference surface may be an axial reference surface in that the reference surface (i.e., a segment normal to the reference surface) is collinear with the longitudinal measurement axis (Z-axis). For a threaded product, such as a tubular product, a radial reference point or surface(s) may also be provided that is configured to reference against an outer or inner radial surface of the part. Axial (Z-axis), radial (X-axis) and other reference surfaces or points may be provided as needed or desired.

The dimension measurement system may comprise a portion, such as a measurement head, to which a thread contact or probe element may be secured. The thread contact element is preferably configured for use with the particular screw thread system to be measured. For example, the thread probe element may be a substantially spherical body of known or predetermined dimension or any other shape of known dimensions. Thus, in practice, when the thread contact element engages the screw thread, the predetermined dimensions of the contact element will inform the user of the inspection system precisely where the contact element engages the screw thread (such as the specific location on a load flank). With this type of information, a determination of whether the screw thread is within or without tolerance at that specific location can be determined. Alternately or additionally, the measurement head may support two or more thread contact or probe elements to make a planar measurement, rather than a point measurement. The dimension measurement system may be configured to indicate absolute measurements (i.e., relative to the reference surface(s)) or relative measurements (e.g., relative to the screw thread system under inspection).

The inspection systems described herein may provide relative or absolute measurements. For example and not limitation, an absolute measurement in the Z-axis requires that the dimension measurement system be "zeroed" against a known reference point, such as the pin end. To facilitate zeroing or datuming the dimension measurement system, a gap or slot may be required in or between datum bumpers so that the measurement head contact probe can be retracted along the Z-axis to the pin end and then translated along the X-axis so that the contact probe contacts the pin end or other absolute reference point. Once in position, the dimension measurement system may be zeroed or referenced to this point in known manner, such as by activating a zeroing functionality. To the extent the dimension measurement system needs to be zeroed in the X-axis a similar procedure may be employed, including zeroing against the root of the first full thread.

For embodiments of the inspection system utilizing electronic dimension measurement systems, the measurement system may comprise one or more tactile buttons or a touch screen providing power (on/off), measurement, units, recording, and/or transmission functionalities. For example and not limitation, the dimension measurement system may comprise a "record" feature, which when activated will acquire and/or store and transmit the then existing dimensional information (e.g., absolute or relative measurement). Alternately or additionally, the inspection system may comprise "record load flank" and "record stab flank" functionality as well as "clear last," clear all" and "transmit" functionality. Alternately or additionally, recording of measurement can be time based such that if a single measurement value is sampled over a defined period, the system may assume a measurement is intended and the value may then be recorded. A visual or auditory signal, such as a beep, may be provided to indicate that a measurement has been recorded or transmitted. In a preferred electronic embodiment, a digital dimension measurement system comprises "start" functionality, "record" functionality and at least two differently colored indicators.

These measurements may be reported or indicated optically, such as by a dial indicator, scaled rule or digital display, and/or may be stored or transmitted electronically in analog or digital format. For example, and without limitation, the inspection system, and preferably the dimension measurement system can record or store measurements to persistent or removable memory, such as a removable SD card. Alternately or additionally, the inspection system, and preferably the dimension measurement system can transmit measurement data and/or other information electronically, either through wired or wireless protocols. In a preferred embodiment, the inspection system transmits and receives data via Bluetooth® or another IEEE 80215 wireless transmission to a data storage and processing system. Regardless of data transmission method, the data storage and processing system may comprise a smart phone, tablet (such as an iPad®), laptop computer, desktop computer, website, or cloud-based system. The data storage and processing system may be configured with processor(s), memory, software, and other circuitry and components to compare the recorded measured data with tolerance data for the particular screw thread under inspection and provide a report of whether the screw thread is within or without the screw thread tolerances. For purposes of this disclosure, the phrase "inspection system" includes a data processing system whether resident on the handheld device or housed separately.

In a typical, but not exclusive operation, and using the pin end of an oilfield tubular as an exemplar, the operator powers on the digital dimension measurement system, which provides a visual indication, such as an amber light, that the inspection system is ready for use. The operator places the axial reference surface against the pin end of the tubular and the radial reference pins against an upper, outer surface of the pin end. The inspection system frame, e.g., the axial reference surface, may comprise a detection system, such as a micro switch, that is activated when the axial reference surface is operatively engaged with the product's reference surface (e.g., pin end). Once the detection system is activated by proper engagement of the inspection system with the product, the visual indicator turns green, for example, indicating that the inspection system is ready to record measurements. Additionally, an indicator may be activated indicating the inspection system is ready to record a stab flank measurement. The measurement head is translated axially (Z-axis) to the reference or datum point on the pin end, and the Z-axis measurement is zeroed to this point. The X-axis is also zeroed, either to this same reference point to another reference point, such as the root adjacent the stab flank of the first full thread. Thereafter, the measurement head can be translated to any portion of the screw thread of interest (e.g., the middle thread from the pin end) and the measurement head lowered into the thread (X-axis), such as by translating the carrier in a downward direction (or allowing the biasing force to translate the measurement head), to cause the contact element to touch the root of the screw thread.

The measurement head is translated so the contact element contacts both the root surface and the stab flank surface, and is held in positon. Assuming the inspection system indicator still shows green indicating proper reference surface engagement (if provided), the stab flank measurement may be recorded by activating a record functionality. Once the data representing the stab flank measurement has been recorded, an indicator changes or activates to show that the inspection measurement system is ready to record a load flank measurement. The measurement head is translated in the axial direction (and radial direction, if needed) so that the contact element engages the root and load flank of the screw thread. Once the contact element is in position, and the indicator shows green, the load flank measurement may be recorded by activating the record functionality. If recordation of data was effective, the indicator reverts to a stab flank ready condition. In accordance with a measurement protocol previously established, the operator can move the measurement head to a different, yet predetermined portion of the screw thread through axial translation, rotation of the inspection system relative to the part, or a combination of both. For example, the inspection system first may be oriented at 0° (e.g., 12 o'clock) and measurements of the $3^{rd}$, $6^{th}$ and $9^{th}$ threads obtained. The inspection system may then be rotated to the 90° position (e.g., 3 o'clock) and measurements of the $3^{rd}$, $6^{th}$ and $9^{th}$ threads obtained. Similar measurements at 180° and 270° may be obtained as well, as desired. It will be appreciated a benefit of radial or X-axis translation is that the inspection system does not have to disengage from the product reference surface. This results in more accurate and repeatable measurements.

The inspection systems are also capable of measuring thread taper, which is a relative measurement within the thread system and does not necessarily requiring zeroing the dimension measurement system to a reference point. Thread lead or pitch may also be determined. For wedge thread systems, stab flank lead and load flank lead may be determined. The inspection systems described herein can detect and quantify what is referred to in the art as "drunken lead."

In preferred embodiments, the digital dimension measurement system has wireless transmission capability, such as, but not limited to, Bluetooth®. While measurements are being acquired or recorded, such as to one or more memory buffers, whether in the Z-axis direction, X-axis direction or both, the wireless transmission functionality packages the data and transmits it to the remote data storage and processing system where the data is organized and compared against tolerance data for the product being inspected. A report may be generated showing the comparison of recorded data to tolerance data.

Turning now to the several figures that illustrate possible embodiments of systems and methods utilizing one or more of the inventions discussed above, FIG. 3 illustrates a wedge thread inspection system 300 shown during inspection of an external wedge thread product 302, such as an oilfield tubular pin end. FIG. 4 illustrates a wedge thread inspection system 400 shown during inspection of an internal wedge thread product 402, such as an oilfield tubular box end. These figures will be described together.

The inspection systems 300 and 400 comprise a frame system 304, 404, which may comprise one or more assemblies or components. It is preferred, but not required that the frame system 304, 404 comprise two components. A first frame component may be a datum face 304a, 404a and the second component may be a carrier frame 304b, 404b. The datum face component 304a, 404a and the carrier frame component 304b, 404b are preferably removably coupled to one another, such as by threaded fasteners 305, 405. The frame system 304, 404 is preferably configured to be held by a human hand and supports a dimension measurement system 306, 406 such as a digital depth micrometer. The measurement system 306, 406 comprises a measurement head 308, 408, having one or more thread contact elements or probes 310, 410 connected to a slide 316, 416. Frame system 304, 404, and particularly datum face component 304a, 404a comprises a face or surface 312, 412 configured to register against a reference or datum point or surface on the wedge thread product 302, 402, such as for example the pin end or the box end of a threaded tubular product.

The wedge thread inspection system 300, 400 can translate in an axial direction—that is, the measurement head 308, 408 can extend axially (along the Z-axis) to reach multiple threads along the product 302, 402 length. Also, the measurement system 306, 406, and therefore the measurement head 308, 408 can translate in a radial or vertical direction (along the X-axis) orthogonal to the axial measurement direction to accommodate for an increasing or decreasing radial dimension of the product 302, 402, such as for example a tapered screw thread.

Figure 3:
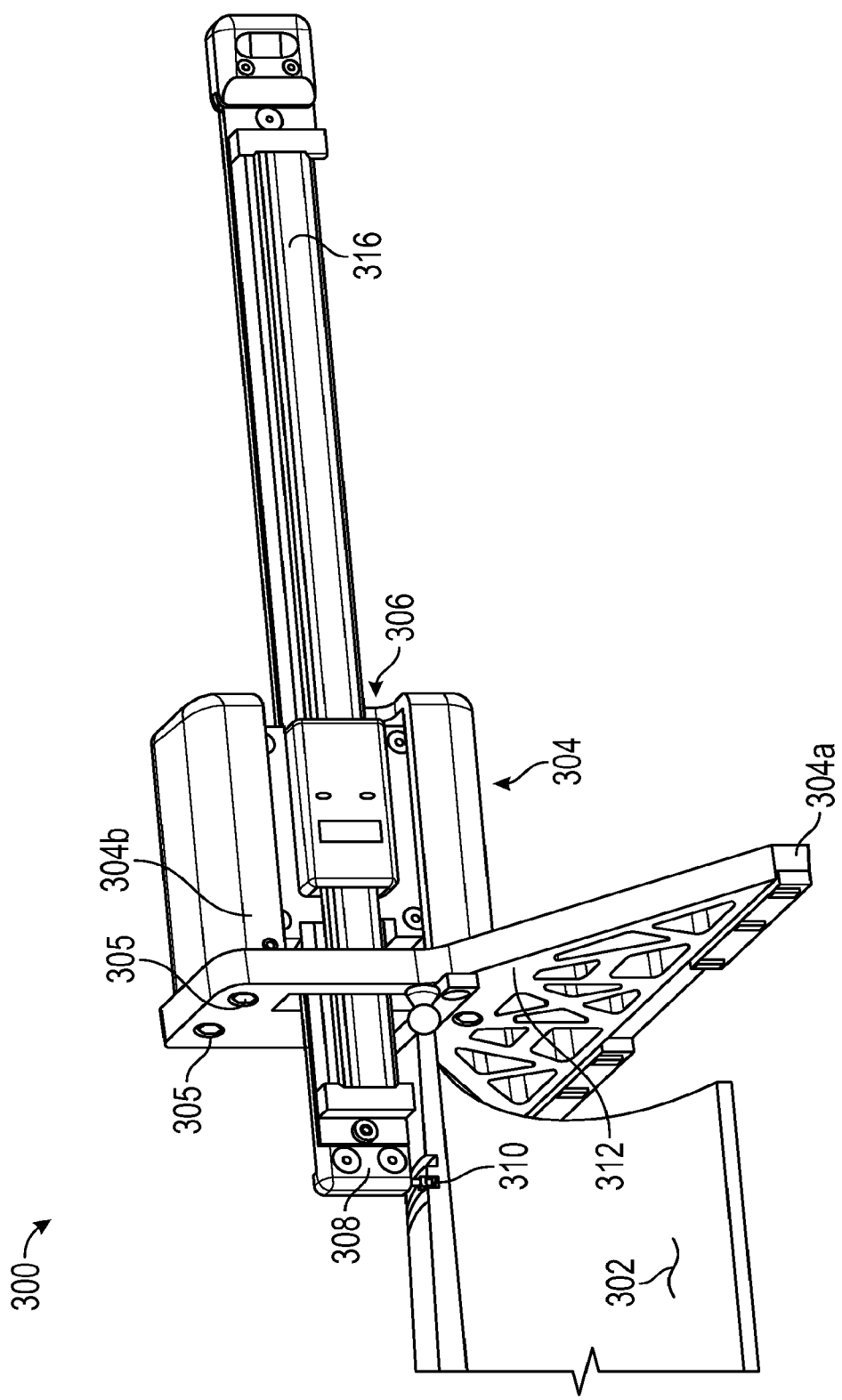
FIG. 3 illustrates one of many possible embodiments of a digital inspection system according to the present inventions configured to measure or inspect external thread systems.
Figure 4:
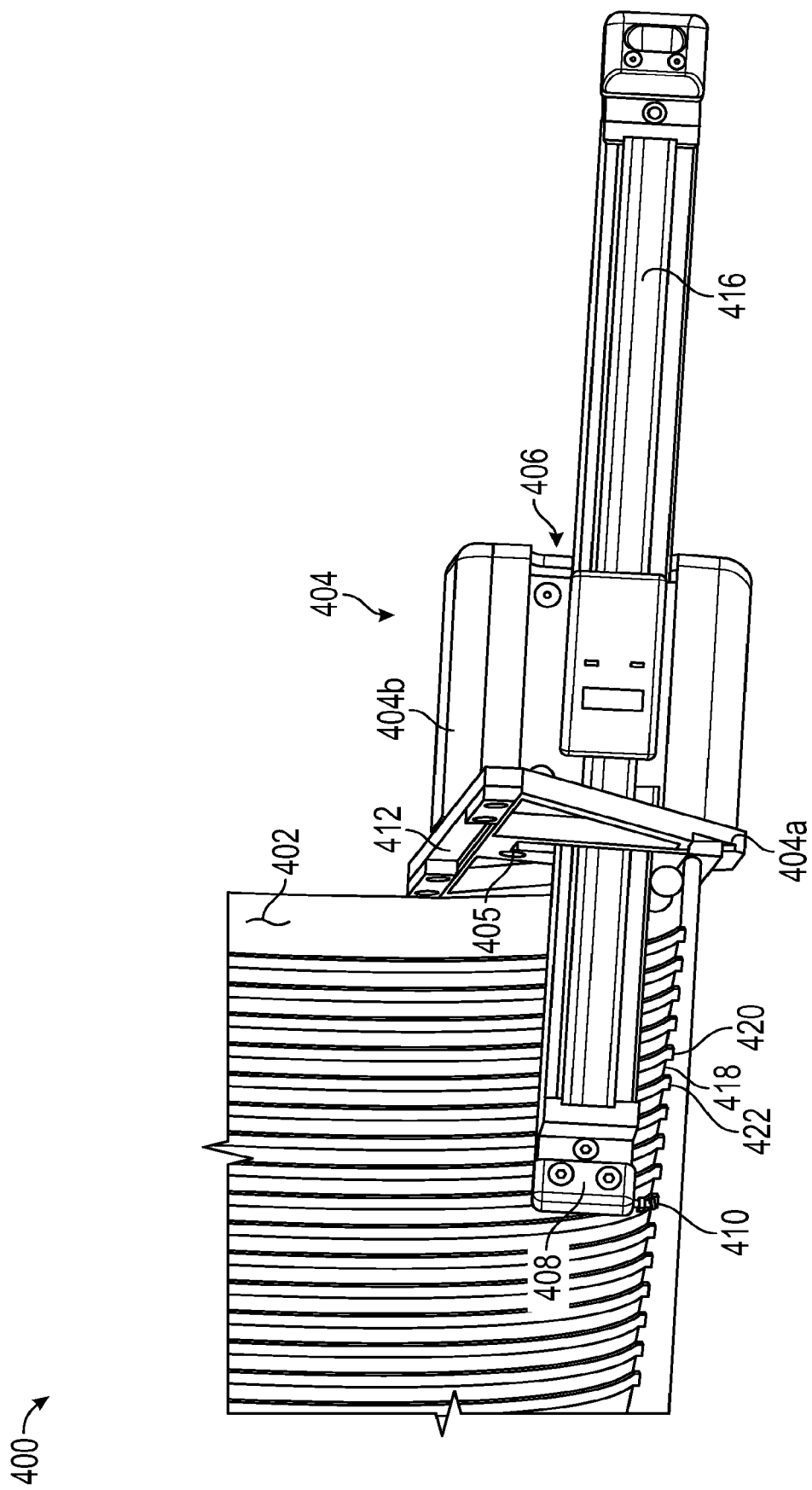
FIG. 4 illustrates one of many possible embodiments of a digital inspection system according to the present inventions configured to measure or inspect internal thread systems.

In use, the user (human) will reference the wedge thread inspection system 300, 400 to the product to be measured, such as by engaging the reference surface 312, 412 with the pin end as shown in FIG. 3, or the datum surface 412 with the box end as shown in FIG. 4. The user may then select any thread of interest, such as the $2^{nd}$ thread as shown in FIG. 3, or the $10^{th}$ thread as shown in FIG. 4 The wedge thread inspection system 300, 400 can then measure the width of the thread at that location by contacting the contact element 310, 410 against the thread root and load flank and then moving the measurement head 308, 408 so that the contact element 310, 410 touches the root and stab flank of the thread, or vice versa. The difference between these two measurements defines the width of the thread root at that location, as corrected by the dimensions of the contact element and the thread contact point, as desired.

Referring to FIG. 4, the thread system on threaded product 402 comprises a plurality of threads roots and crests when viewed along a single measurement axis as illustrated. For example, thread crest 418 is bounded by thread root 420 and thread root 422. Depending on the design criteria and/or inspection criteria of the specific thread system, the width of a thread root, such as root 420 can be determined, or the width of the thread crest 418 can be determined, or both, regardless of whether the thread system is an internal or external thread system.

Figure 5:
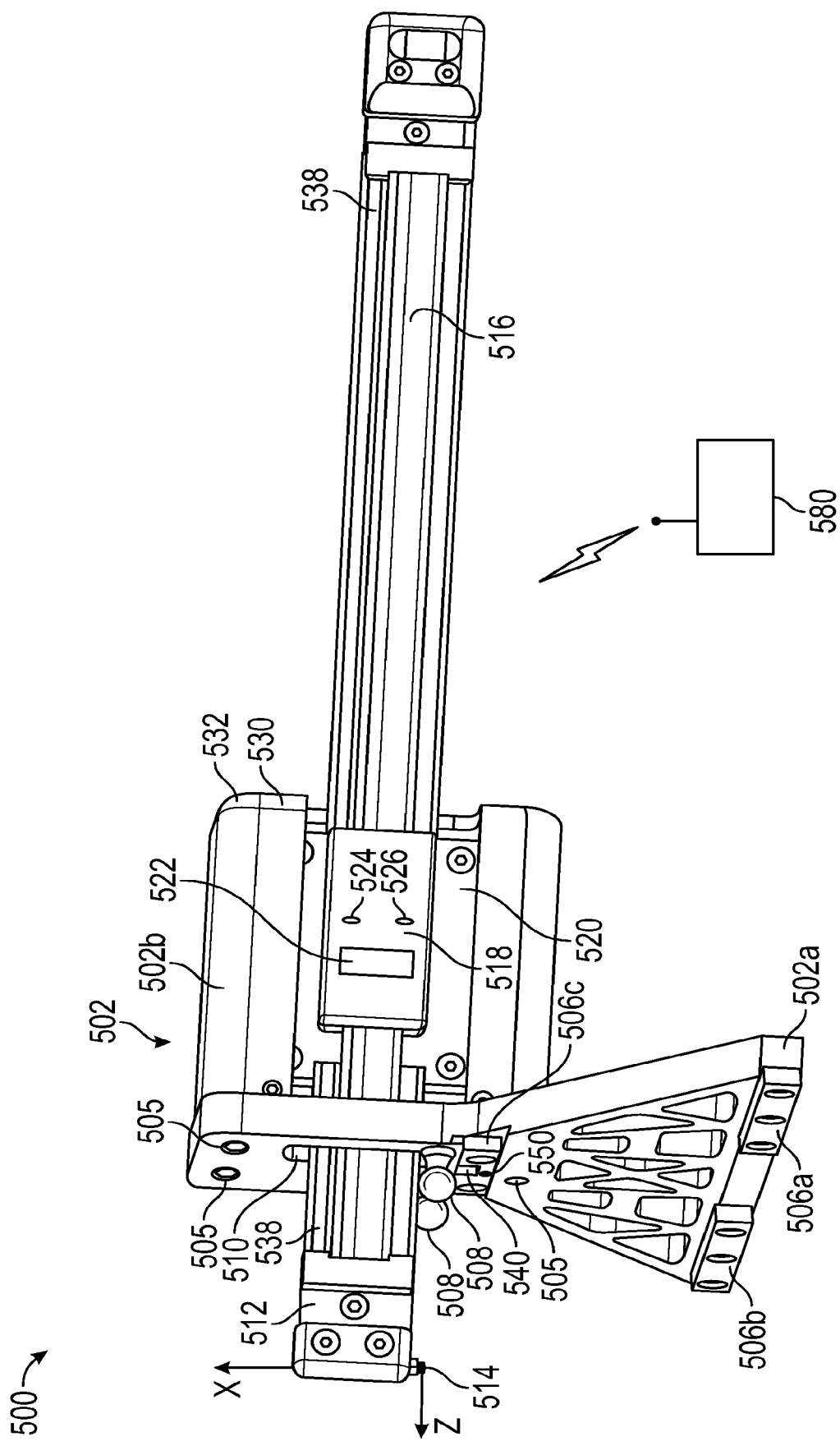
FIG. 5 illustrates the external inspection system of FIG. 3.
Figure 6:
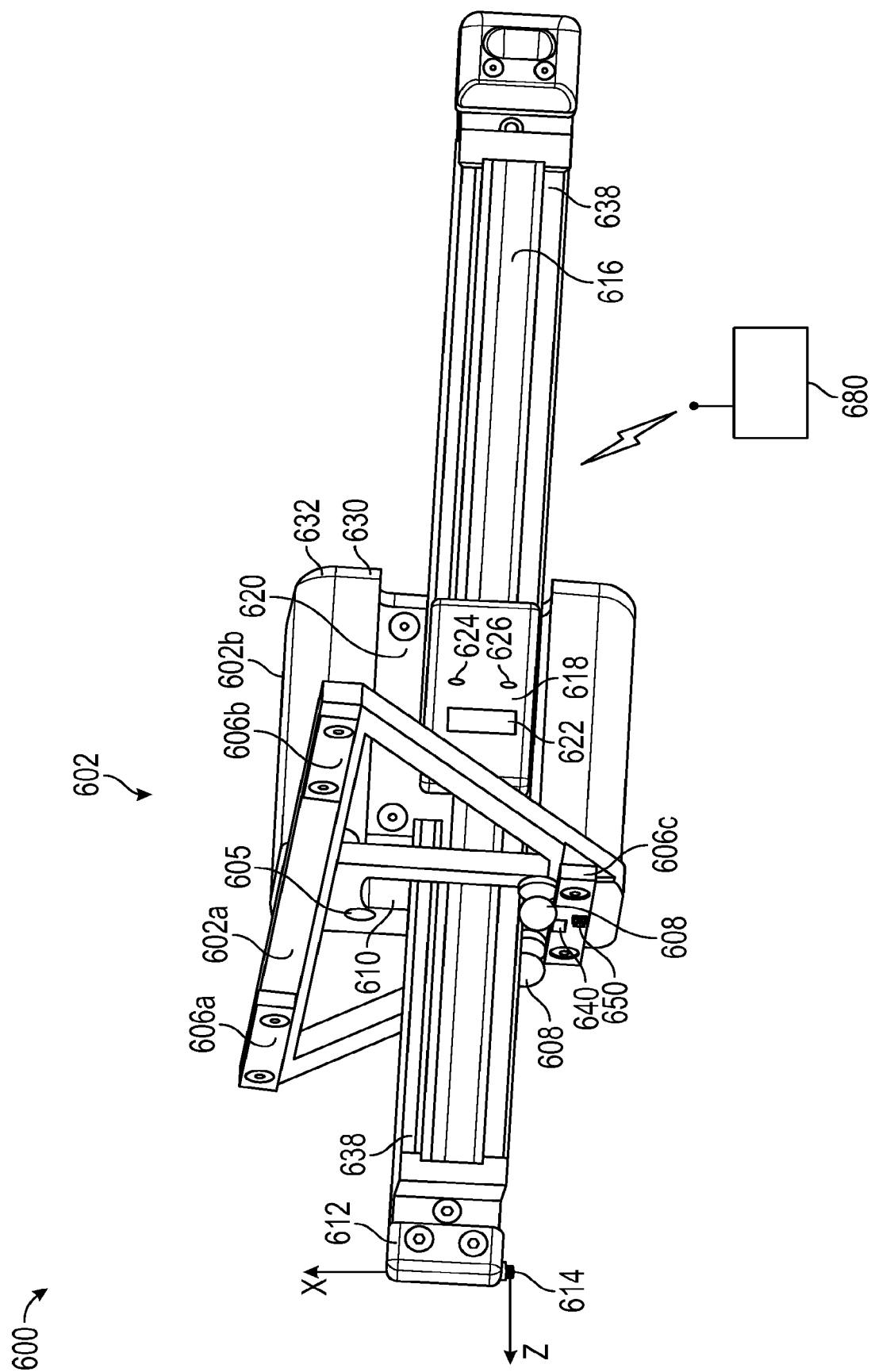
FIG. 6 illustrates the internal inspection system of FIG. 4.

Turning now to FIG. 5 and FIG. 6, preferred embodiments of a wedge thread inspection system 500, 600 are illustrated. Similar to previous inspection systems described, the inspection system 500, 600 comprises a frame system 502, 602 preferably constructed from a light material such as aluminum or fiberglass or other composite type material. Frame system 502, 602 preferably comprise two components, a datum face component 502a and 602a, and a carrier component 502b, 602b. These two frame system components are removably coupled together by fasteners, such as threaded fasteners 505, 605. It will be appreciated that inspection system 500 is configured to measure external threads, and inspection system 600 is configured to measure internal threads. It will also appreciated that a single carrier component 502b, 602b can be mated to either an external thread datum face component 502a or an internal thread datum face component 602a.

Weight reducing holes or voids may be strategically placed in the frame system 502, 602, such as in datum face components 502a, 602a to reduce its weight without affecting its strength or rigidity. The datum face component 502a, 602a has a reference surface, which preferably comprises axial reference bumpers 506a, 506b and 506c (606a, 606b and 606c). Preferably, the datum face component 502a, 602a comprises three axial reference or datum bumpers 506a, 506b and 506c (606a, 606b and 606c) arranged generally triangularly, as shown. In addition, one or more radial reference points 508, 608 are also provided to reference off the external pin end or internal box end.

It is preferred, but certainly not required, that the reference bumper 506c, 606c at the apex of the triangle comprises a micro switch 550, 650 or other transducer configured to indicate, such as by generating a signal, that the reference bumper 506c, 606c is in operational contact with the work piece reference surface.

Frame 502, 602 comprises a main window 510, 610 through which a measurement head 512, 612 may pass. Measurement head 512, 612 comprises a contact probe 514, 614 of known dimension for contacting the thread profile to be measured. The measurement head 512, 612 is operatively connected to a slider 516, 616 that operatively interfaces with a dimension measurement system 518, 618, for example a digital depth gauge, such as those available from Sylvac or Gagemaker LP. The measurement system 518, 618 and slider 516, 616 are attached or coupled to a trolley 520, 620 that is free to translate in the positive and negative X directions, as shown. In this particular embodiment, the dimension measurement system assembly (512, 520 and 516) and (612, 620 and 616) is biased in the negative X direction. This motion (e.g., radial displacement) allows the measuring head 512, 612 to be raised or lowered relative to the workpiece (e.g., 102) being measured, such as when measuring tapered threads.

The dimension measurement system 518, 618 is preferably mounted to a stiffening component 538, 638 that spans the length of the slider 516, 616. The slider 516, 616 may slide relative to the stiffener 538, 638, or preferably, the slider 516, 616 is rigidly coupled to the stiffener 538, 638 and the slider/stiffener assembly may translate as a unit. It will be appreciated that the stiffener 538, 638 provides additional support and rigidity to convention digital depth gages, and prevents or reduces measurement errors caused by bending, torqueing or other unwanted deflections in the dimension measurement system 518, 618.

Optionally, the embodiments illustrated in FIG. 5 or 6 may comprise a dimension measurement system 518, 618 that can detect and transduce displacement in the radial or X-axis direction. Alternately, the X-axis displacement measurement system may be separate from the axial (Z-axis) dimension measurement system 518, 618, and coupled to the carrier 502b, 602b and/or trolley 520, 620, or some other structure allowing differential displacement measurement relative to frame 502, 602. As can now be appreciated, the radial (X-axis) displacement between successive flank measurements can be used to determine the taper or pitch line of the thread system.

It will be appreciated that to make absolute Z-axis measurements, the contact probe 514, 614 should be zeroed against the datum surface of the product to measured or inspected. In the case of an oilfield tubular, the datum surface is the pin end or the box end. To facilitate zeroing the inspection system 500, 600 against this datum surface, datum bumper 506c, 606c may comprise a gap or slot 540, 640 configured to receive the contact probe 514, 614 so that it can be referenced against the pin or box end. In this way, once the inspection system 500, 600 is referenced to the tubular, the measurement head 512, 612 can be translated toward the datum surface and then translated downward along the X-axis so that the contract probe 514, 614 contacts the datum surface. The dimension measurement system 518, 618 can be zeroed to position in the manner provided, such as by invoking a "zero" or "reference" functionality. It will be noted that not all measurements need to be zeroed to a datum. For example, and without limitation, a taper measurement does not require that the inspection system 500, 600 be zeroed in either Z-axis or X-axis, however, such referencing to datum surface is preferred. To reference the X-axis, typically the contact probe 514, 614 will be zeroed against the root of the first thread and the load flank.

The embodiments illustrated in FIGS. 5 and 6 comprise a wireless data transceiver 530, 630 and a data port 532, 632 for wired data transmission and reception, such as by Ethernet cable or USB cable, both of which may be located on the dimension measurement system 518, 618 or adjacent the dimension measurement system. The dimension measurement system 518, 618 may comprise a display window 522, 622 and a plurality of visual indicator and/or buttons 524, 624, 526, 626 with preprogrammed functionality. For example and not limitation, the inspection system 500, 600 may comprise a taper functionality in which successive measurements are used to determine taper only; a width functionality in which successive measurements are used to determine thread width, or a combined functionality where all measurements include both Z-axis and X-axis measurements from which taper, width, lead and other thread system parameters may be determined.

Figure 7A:
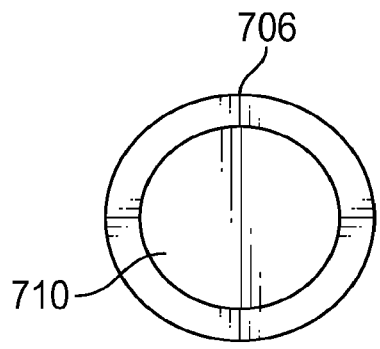
FIGS. 7A and 7B illustrate an embodiment of a contact probe useful with wedge thread systems.
Figure 7B:
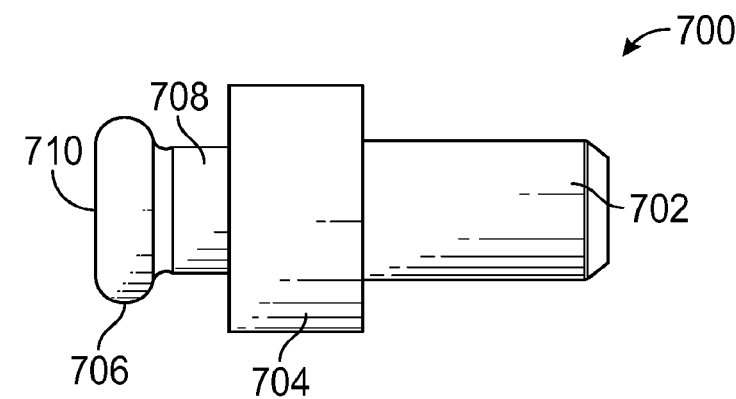

FIGS. 7A and 7B illustrate a preferred form of thread contact or probe element 700 that may be used with inspections systems described herein. Probe 700 may comprise a threaded portion or other engagement system 702 configured for engagement with a measurement head (e.g., 512, 612). For threaded engagement, probe element 700 may also comprise a land, including a wrench land, 704. A contact element 706 is provided and is configured to interface with the screw thread system under measurement or inspection (as discussed with respect to FIG. 8). In this embodiment, the contact element has a curved sidewall having a constant radius, e.g., a radius of 0.02 inch. Sidewall(s) of varying or different geometries may be used as desired or required. The contact element 706 is coupled, integrally or separately, with the engagement portion 702 by a shank 708. As is apparent from FIG. 8, it is preferred that shank have an outer surface with a diameter that is less than the outer diameter of contact element 706. This is especially beneficial for wedge thread systems having a dovetail design, but is also beneficial for square design wedge thread systems. Contact element 702 may have a distal surface 710 that is flat or slightly convex in shape. For example, it is preferred that surface 710 be spherically convex with a radius of about 0.75 inch.

Figure 8:
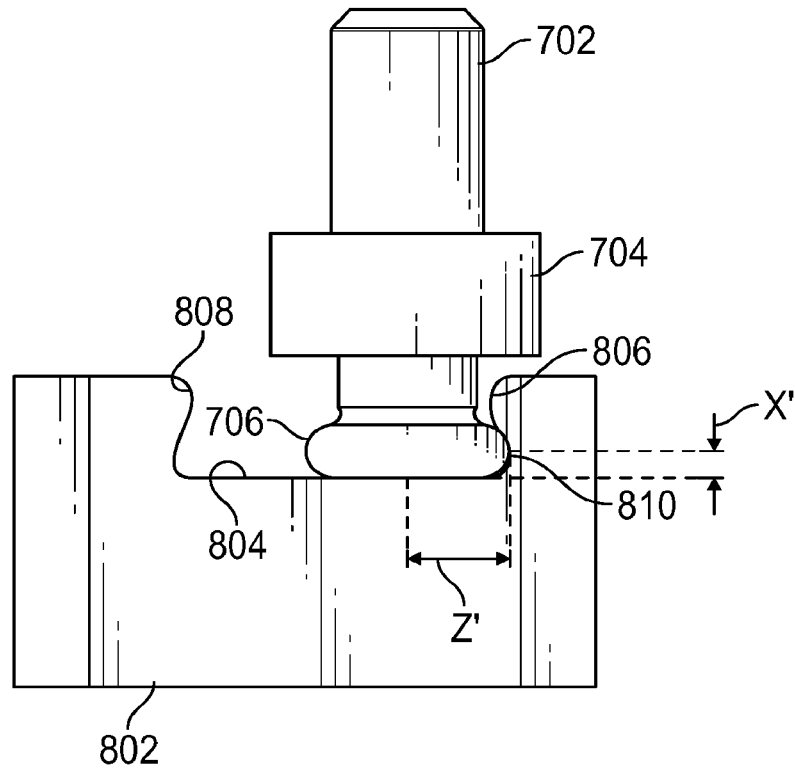
FIG. 8 illustrates the contact probe of FIGS. 7A and 7B in a wedge thread system.

FIG. 8 illustrates probe 700 in a thread root 804 of thread system 802. Probe 700 is shown in measurement contact with the stab flank 806 and thread root 804. Based on the known, such as predetermined, dimensions of the contact element 706, the contact point 810 between the contact element 706 with thread flank 806 is known through calculation. For example, as illustrated the root floor is x' away from the contact point, and the center of the probe 700 is located z' away from the contact point. This information can be used to generate reports or other information about the dimensions of the thread system at the point of measurement.

Figure 9:
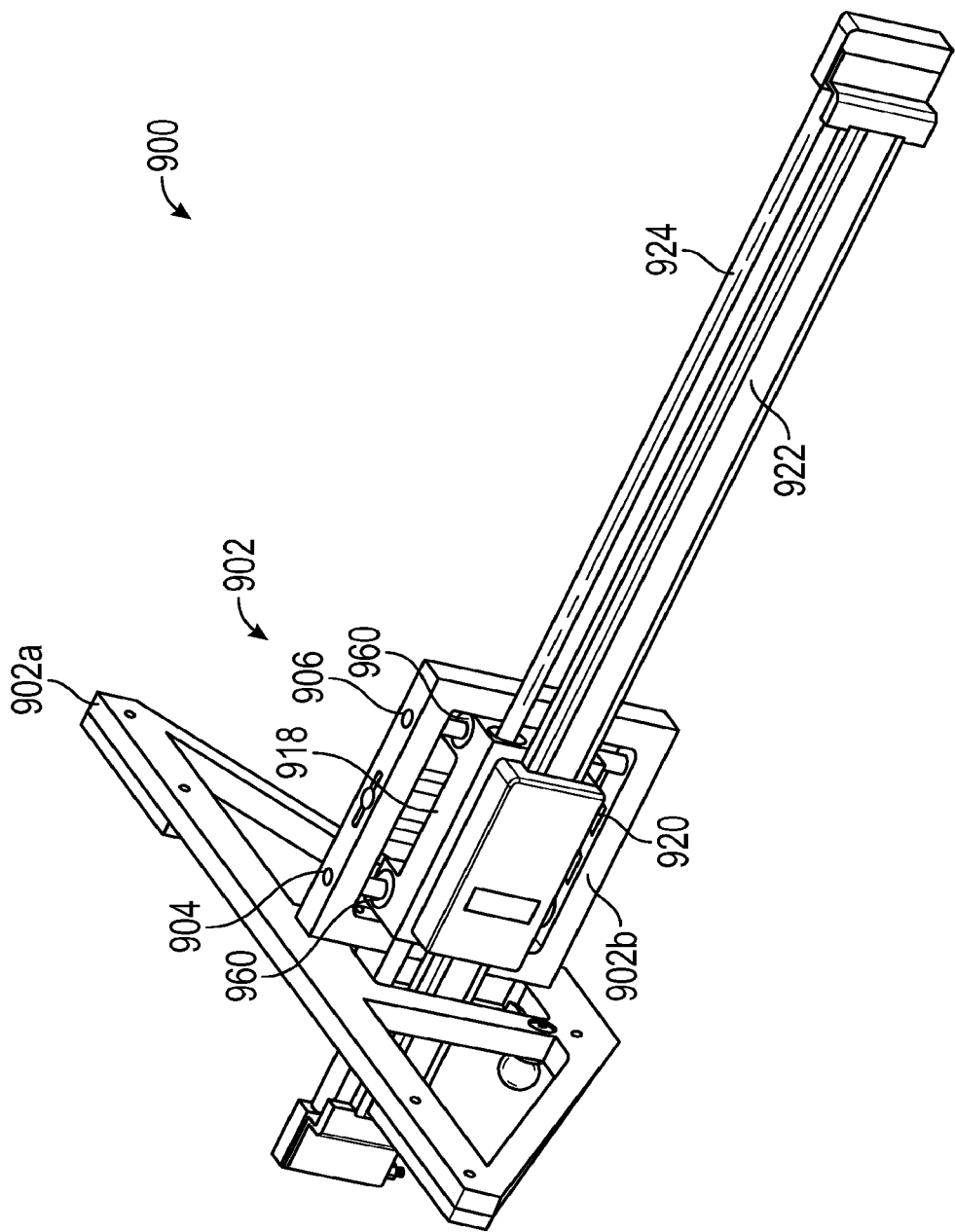
FIG. 9 illustrates an alternate embodiment of a thread inspection system according to the present invention.

FIG. 9 illustrates yet another embodiment of an inspection system 900 in which the frame 902 comprises two portions (integral or separate) 902a and 902b. Frame portion 902a may be similar to frame portions 502a and 602a described previously. Frame portion 902b preferably lies in the X-axis plane. Frame portion 902b comprises two or more guide rails 904 and 906 along which trolley 918 is configured to ride (i.e., slide) in the X-axis. The trolley may comprise, and preferably does comprise one more X-axis transducers 960, as described above, configured to transduce X-axis displacement as the trolley moves along guide rails 904, 906. Alternately, frame portion 902b may house the X-axis transducer.

Trolley 918, comprises a Z-axis displacement transducer 920 coupled thereto, such as described previously, to transduce axial (Z-axis) displacements. The Z-axis displacement transducer 920 also comprises a slider 922 and a stiffener system 924 to which the slider 922 is rigidly coupled. The stiffener systems 924 may comprise one or more rails that pass through the trolley 918 such as on bearings.

Figure 10A:
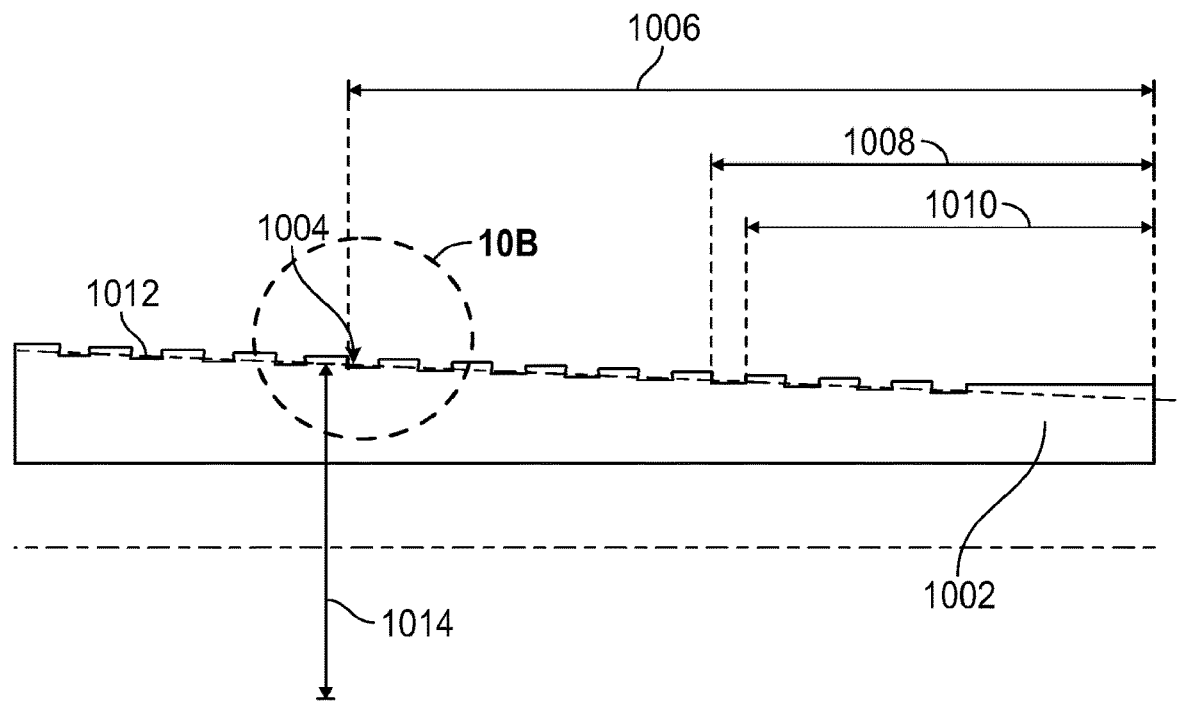
FIGS. 10A and 10B illustrate a typical wedge thread with various thread parameters identified.

Having described systems and devices utilizing aspects of the inventions disclosed herein, we will now describe how these systems and devices may be used. FIG. 10A illustrates a wedge thread system on the pin end of an oilfield tubular product 1002. As designed, this thread system has a designated 'sweet spot" 1004 on a particular stab flank located a distance "M" 1006 away from the reference datum (i.e., pin end). FIG. 10A also illustrates a stab flank measurement 1008 and a load flank measurement 1010 at a location other than the sweet spot 1004. Also shown is pitch or taper line 1012 and the pitch diameter 1014, such as at the sweet spot 1004.

Figure 10B:
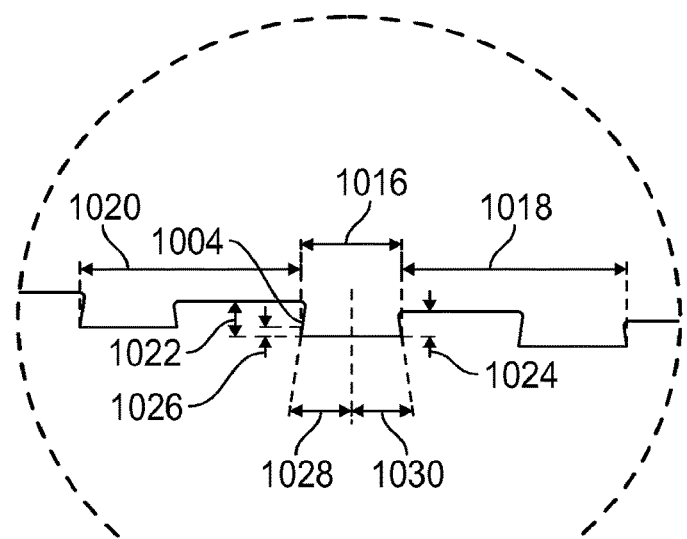
Figure 12A:
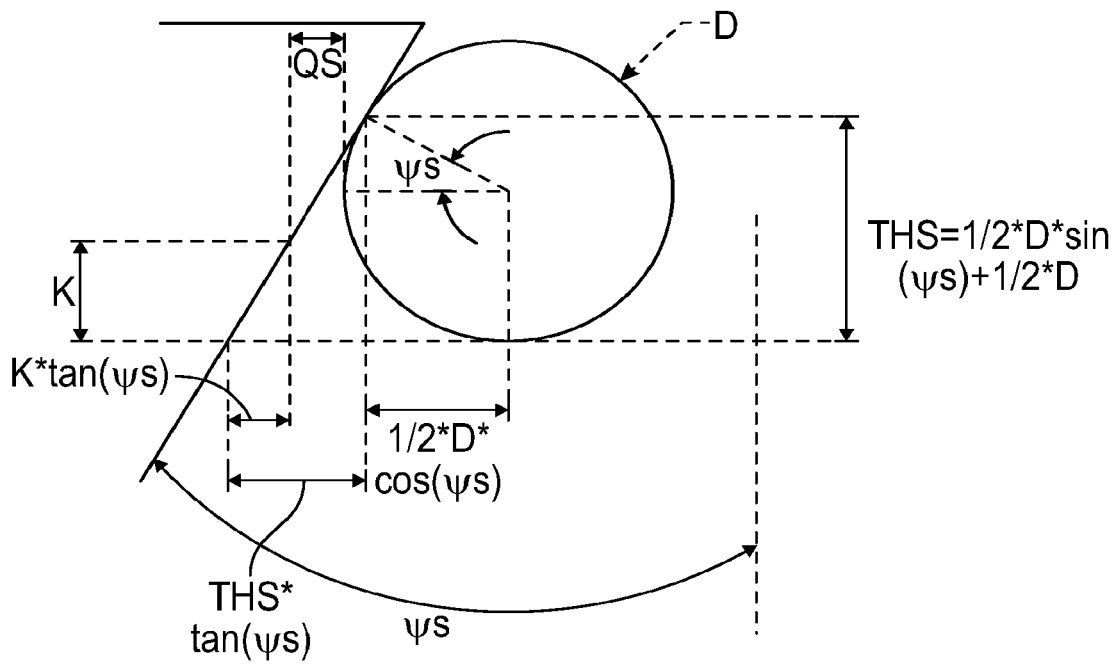
FIGS. 12A-12D illustrate other various wedge thread parameters useful in inspecting thread systems according to the present inventions.
Figure 12B:
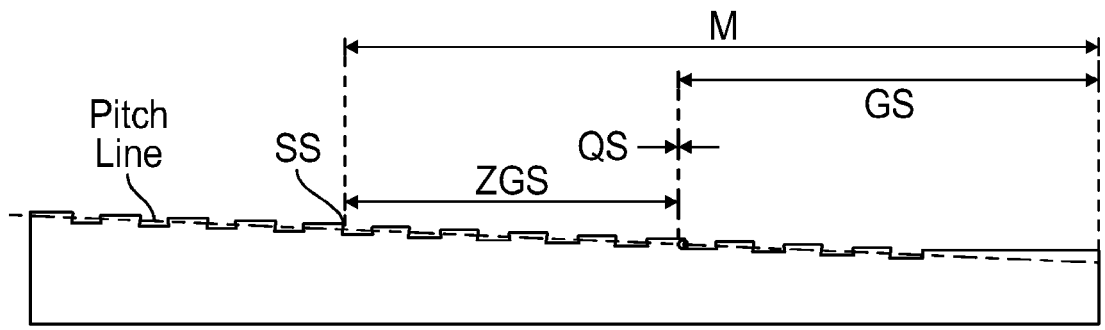
Figure 12C:
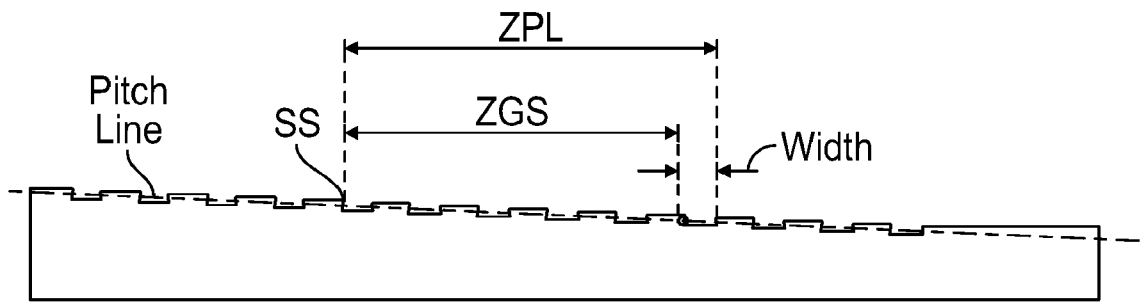
Figure 12D:
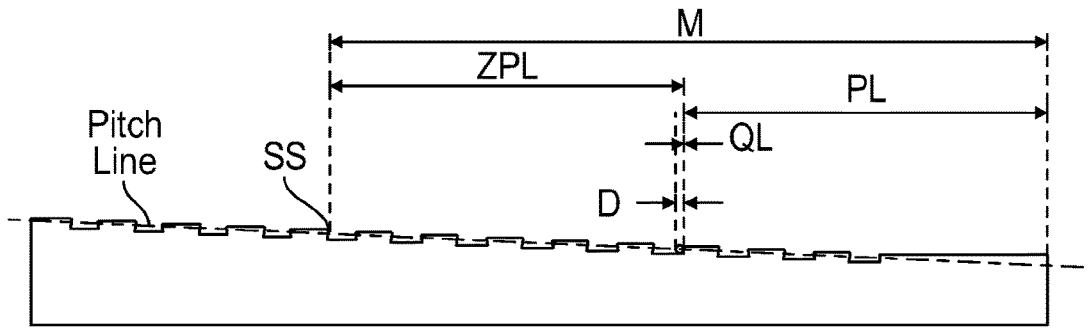

FIG. 10B is a close-up illustration of the thread system profile in FIG. 10A. This figure establishes the various thread system parameters such as the sweet spot 1004, the groove width at the sweet spot 1016, the load flank lead 1018, the stab flank lead 1020, the stab flank height 1022, the load flank height 1024, the radial (X-axis) height from root to sweet spot 1026, the stab flank angle 1028 and the load flank angle 1030. It will be appreciated that in FIG. 10, the stab and load angles 1028, 1030 are measured relative to the X-axis. As shown, those of skill in the art will now understand that the inspection system contact probes (e.g., 700) can be sized to directly contact the designed sweet spot 1004 for a given thread system, or the actual contact point can be calculated and measurements converted to the designed sweet spot 1004.

FIG. 11 represents typical data that may be entered into a data processing system configured for use with the inspection systems as described above, such as data processing system 580, 680. In this embodiment, all of the values 1102 through 1122 are inputted, such as by keyboard, digital scanning, RFID, barcode or other electronic download from a physical or electronic file or data stream containing these thread system design parameters. In this example, at least one of the inspection systems described above is used to obtain the measurement GS (1124) from the product under inspection. GS represents the distance along the Z-axis from the datum (e.g., pin end) to the stab flank of the thread being measured (i.e., not necessarily the stab flank associated with the sweet spot). Based on this measured value and the inputted design parameters of the thread system, the data processing system will calculate PL (1168), which is the distance along the Z-axis from the datum to the load flank of the thread being measured. In this example, for a measured stab flank distance (GS) of 4.143 inches (105.2 mm), the data processing system calculates that the load flank distance should be (PL) 3.87141 inches (98.3338 mm) along the Z-axis. The data processing system can compare the calculated value (3.87141 inches, 98.3338 mm) to the measured value (e.g., 3.8753 inches (98.433 mm), not shown in FIG. 11) revealing a variance or error of −0.00039 inch (−0.00988 mm). It will be appreciated that the above example calculates the corresponding load flank distance from a measured stab flank distance. It will be understood that the corresponding stab flank distance also can be calculated from a measured load flank distance.

Thus, the data processing system, whether as a separate system or as part of an inspection system, may be programmed or otherwise configured to run two calculations per thread groove to determine which of the load flank lead or the stab flank lead conform to design specifications. Detected errors can be used to correct errors in the manufacturing process, such as CNC programming errors or implementation errors, such as latency or hysteresis. First, stab flank distance from the reference datum (e.g. pin end) is measured and stored on the dimension measurement system or transmitted to the data processing system (e.g., smart phone). Next, the load flank distance from reference datum is measured and stored and/or transmitted. The stab flank measurement (or calculated measurement) is used as the design measurement at that point, and the corresponding design groove or root width is determined, such as from a look-up table. The design location of the load flank length is therefore known by subtracting the root width to the stab length measurement and is compared to the load flank measurement (or calculated measurement). Any error between the design distance for the load flank and the measured distance for the load flank may be reported.

For the same stab and load flank measurements, the load flank distance is used as the design measurement at that point, and the corresponding design groove or root width is determined, such as from a look-up table. The design location of the stab flank length is therefore known (e.g., calculated) and is compared to the stab flank measurement (or calculated measurement). Any error between the design distance for the stab flank and the measured distance for the stab flank may be reported.

Because a wedge thread has a stab flank pitch or helical cycle and a different load flank pitch or helical cycle, by comparing the results of the calculations presented, a graphical representation can be generated to display or show the pattern the manufacturing process is producing as it moves the threading tool up the taper cone. Thus, one advantage of the present invention is that it can document whether the manufacturing process produces the correct helical movement (i.e, flank pitch and lead movement). The inventions may also show if the manufacturing process is not able to correct itself fast enough to maintain the design parameters. The inventions described herein can determine if a particular groove/root width is at the design distance from the reference or datum surface.

FIGS. 12A-12D illustrate in graphical detail the various geometric and trigonometric relationships between the inputted and calculated variables presented above in FIGS. 10 and 11 in the circumstance when the load flank PL is the calculated value. Those of skill in the art having the benefit of this disclosure will be able to derive the equations necessary to calculate the stab flank PS from a measured load flank value GL. As can be seen from FIG. 12D, the load flank distance from the datum is calculated as $$PL = M + ZPL + QL + D$$

where the variables are vectors and therefore may have negative value. Using the values from FIG. 11, the PL is calculated as $$PL = (5.24215 \text{ in.}) + (-1.44297 \text{ in.}) + (0.00023 \text{ in.}) + (0.072 \text{ in.}) = 3.87141 \text{ inches}$$

or $$PL = (133.151 \text{ mm}) + (-36.6514 \text{ mm}) + (0.00584 \text{ mm}) + (1.829 \text{ mm}) = 98.3344 \text{ mm}$$

Figure 13:
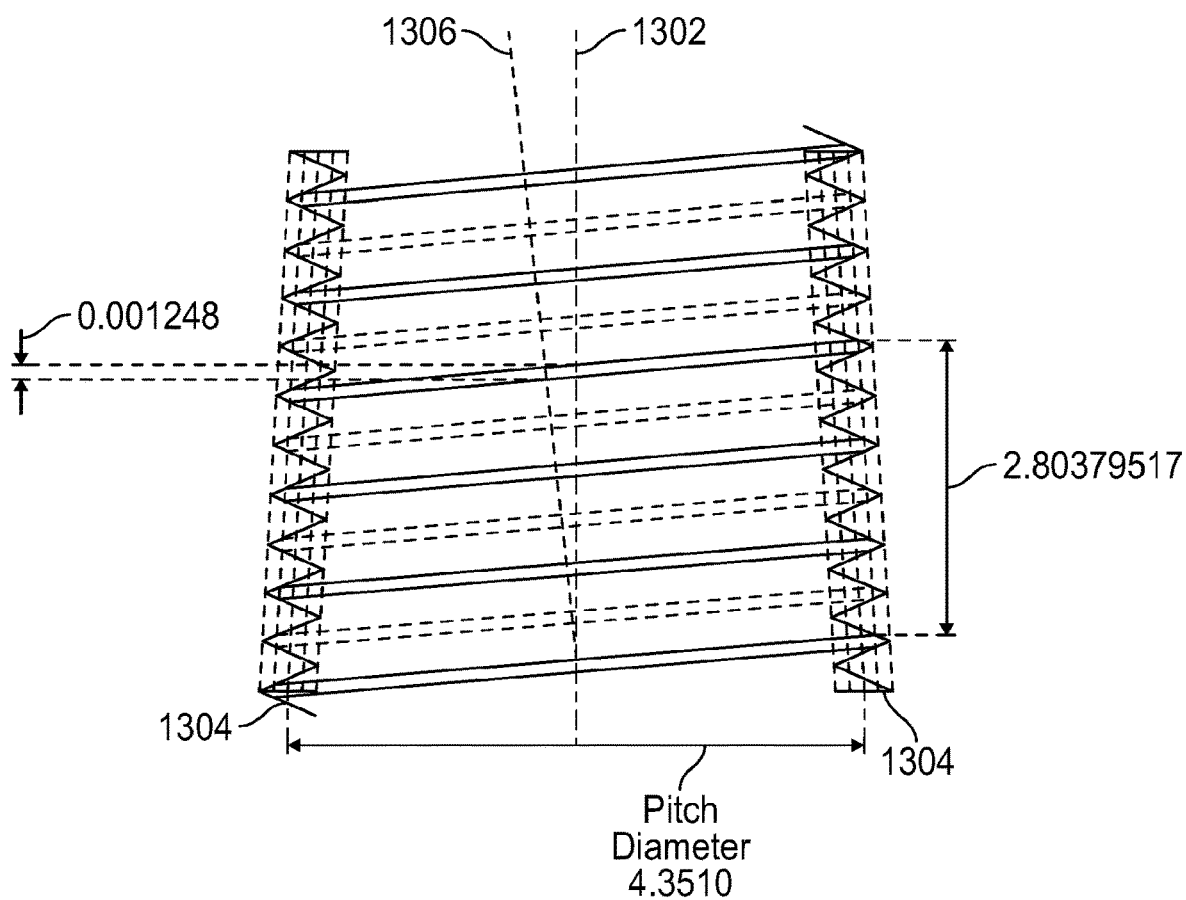
FIG. 13 illustrates the type of data that may be inputted to a data processing system and the type of calculations that may be carried out by a data processing system.

FIG. 13 illustrates a tapered thread system, such as, but not limited to, a wedge thread system. The Z-axis 1302 is shown perpendicular to the datum surfaces 1304. Because the thread system forms a helix about the taper cone, a helix axis 1306 is shown offset an angular amount from the Z-axis 1302. It will be understood by now that the inspection systems described above take measurements along the Z-axis 1302 as opposed to the helix axis 1306. FIG. 13 demonstrates the offset between thread lead or pitch (e.g., stab flank lead or load flank lead) as measured on the Z-axis and the helix axis. The systems described herein can convert Z-axis lead measurements to helix axis lead measurements as desired or required.

Further, the inspection systems methods disclosed herein can measure or determine what is colloquially referred to as "drunken lead." For example, once an inspection system is reference to the product, such as a pin end comprising a wedge thread, the stab flank location of the first thread can be measured as well as the stab flank locations of each successive stab flank. The data processing system can calculate the average or composite stab lead and compare it to the design stab lead LS (1102 in FIG. 11). Of course, if the design stab lead is given relative to the helix axis, rather than the Z-axis, the data processing system can convert the calculated Z-axis lead to a helix axis lead. It will be appreciated that the same inspection can be performed on the load flank lead.

It is intended and expressly disclosed that each of the features, functionalities and components described above with respect to FIGS. 3-13 may be mixed, matched and combined in any order or configuration to produce embodiments of inspection and data processing systems not expressly described herein in words or figures.

Those persons of skill in the art having benefit of this disclosure will now appreciate that the inspection systems describe herein, comprising data processing systems described herein, can measure along the Z-axis every stab flank and load flank with reference to the datum face at positions between 0° through 360°; can acquire and/or store, internally or to a remote database, all measurements taken, via wired transmission or wireless transmission, such as, Bluetooth, Radio Frequency or Wi-Fi; can calculate the groove or root width based off of the stab flank measured length from the design Sweet Spot; can calculate the groove or root width based off of the load flank measured length from the design Sweet Spot; can create a display or report, such as a sinusoidal mathematical curve, of the groove or root width based off of the stab flank measured length from the design Sweet Spot and/or the groove or root width based off of the load flank measured length from the design Sweet Spot; can display or report the errors/variance to design parameters of each groove width location from the datum face up the taper cone of a thread system; can calculate the length and radial circumferential location from the design Sweet Spot to the measured location; can provide a best average of any groove width and location that is out of design tolerance, which groove width is smaller than design parameters; can display or report, such as by plotting make-up length loss based on grooves or roots that are narrower than design widths; can measure the lead parallel to the Z-axis axis; and/or can display or report, such as by plotting, all stab and load flanks relative to the datum for "Drunken" lead of each flank; and can store all measured values to one or more files, including operators name, part serial number, job order number, date, pipe heat numbers and traceability certifications.

Other and further embodiments utilizing one or more aspects of the inventions described above can be devised without departing from the spirit of Applicant's invention. For example, only, a given embodiment may or may not include both wireless and wired communication capabilities. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A screw thread inspection system, comprising:
a body comprising a first portion configured as a datum reference, and a second portion configured to support a dimension measurement system;
the dimension measurement system operationally coupled to the second portion and comprising a measurement tip;
the dimension measurement system configured to determine distance from the datum reference to the measurement tip along a first measurement axis;
the dimension measurement system also configured so that the measurement tip can translate relative to the body along a second axis perpendicular to the first measurement axis.

2. The system of claim 1, wherein the second axis is a second measurement axis, and the dimension measurement system is configured to determine distance along the second axis.

3. The system of claim 2, wherein the dimension measurement system comprises a trolley configured to translate along the second axis relative to the second portion.

4. The system of claim 1, wherein the dimension measurement system comprises a slider, a measurement head at one end of the slider and the measurement tip associated with the measurement head.

5. The system of claim 4, wherein the dimension measurement system comprises a support structure configured to augment the structural rigidity of the dimension measurement system.

6. The system of claim 1, further comprising a visual indicator configured to display distance along the first axis between the measurement tip and the datum reference.

7. The system of claim 6, wherein the visual indicator is a dial indicator, scaled rule, or digital display.

8. A method of inspecting a screw thread system with the system of claim 1, comprising:
contacting the datum reference to a dimensional reference associated with the screw thread system;
translating the measurement tip associated with the dimension measurement system along the first axis to a first thread system artifact;
zeroing the dimension measurement system along the first axis at the first artifact;
translating the measurement tip along the second axis away from the first artifact;
translating the measurement tip along the first and second axes to a second thread system artifact; and
displaying the distance along the first axis between the first and second artifact on a visual indicator.

9. A method of inspecting a wedge thread system having a plurality of stab flanks and a plurality of load flanks with the system of claim 1, comprising:
providing a wedge thread inspection system comprising a body comprising a first portion configured as a datum reference, and a second portion;
a dimension measurement system coupled to the second portion of the body and configured to determine distance from the datum reference along a first axis defined by the body;
the dimension measurement system also configured to translate along a second axis perpendicular to the first axis; and
a visual indicator configured to display distance data from the dimension measurement system;
contacting the datum reference to a dimensional reference associated with the wedge thread system;
translating a contact element associated with the dimension measurement system along the first axis to a first thread system artifact;
zeroing the dimension measurement system along the first axis to the first artifact;
translating the datum reference along the first axis to a second thread system artifact; and
displaying the distance between the first and second artifact along the first axis on the visual indicator.

10. The method of claim 9, wherein the first thread system artifact is a stab flank and the second artifact is a load flank.

11. The method of claim 10, further comprising:
acquiring a plurality of additional stab flank distances along the first axis for the thread system; and
determining a stab flank lead for the thread system.

12. The method of claim 10, further comprising:
acquiring a plurality of additional load flank distances along the first axis for the thread system; and
determining a load flank lead for the thread system.

13. The method of claim 10, further comprising: determining whether the thread system suffers one or more drunken leads.

14. The method of claim 9, wherein the first and second artifacts are associated with a predetermined thread design sweet spot having a design distance from the dimensional reference.

15. The method of claim 9, wherein the visual indicator is a dial indicator, scaled rule or digital display.

16. The method of claim 8, wherein the visual indicator is a dial indicator, scaled rule or digital display.

17. The method of claim 8, wherein the first thread system artifact is a stab flank and the second artifact is a load flank.

18. The method of claim 8, wherein the first and second artifacts are associated with a predetermined thread design sweet spot having a design distance from the dimensional reference.

19. The method of claim 8, further comprising:
acquiring a plurality of additional stab flank distances along the first axis for the thread system; and
determining a stab flank lead for the thread system.

20. The method of claim 8, further comprising:
acquiring a plurality of additional load flank distances along the first axis for the thread system; and
determining a load flank lead for the thread system.

* * * * *